(12) United States Patent
Ober et al.

(10) Patent No.: US 7,360,203 B2
(45) Date of Patent: Apr. 15, 2008

(54) PROGRAM TRACING IN A MULTITHREADED PROCESSOR

(75) Inventors: Robert E. Ober, San Jose, CA (US); Daniel F. Martin, Mountain View, CA (US); Roger D. Arnold, Sunnyvale, CA (US); Erik K. Norden, Unterhaching (DE)

(73) Assignee: Infineon Technologies North America Corp. CA (US)

( * ) Notice: Subject to any disclaimer, the term of this patent is extended or adjusted under 35 U.S.C. 154(b) by 751 days.

(21) Appl. No.: 10/774,193

(22) Filed: Feb. 6, 2004

(65) Prior Publication Data
US 2005/0177819 A1  Aug. 11, 2005

(51) Int. Cl.
*G06F 9/45* (2006.01)

(52) U.S. Cl. ..................................................... 717/128

(58) Field of Classification Search ................ 717/128
See application file for complete search history.

(56) References Cited

U.S. PATENT DOCUMENTS

| 6,314,530 | B1 | 11/2001 | Mann |
| 6,338,159 | B1 | 1/2002 | Alexander, III et al. |
| 6,854,108 | B1* | 2/2005 | Choi ........................... 717/125 |
| 7,058,928 | B2* | 6/2006 | Wygodny et al. ........... 717/128 |
| 2002/0188831 | A1 | 12/2002 | Jackson et al. |
| 2002/0194457 | A1 | 12/2002 | Akkary |
| 2003/0135789 | A1 | 7/2003 | DeWitt, Jr. et al. |
| 2005/0066149 | A1* | 3/2005 | Kanade ......................... 712/1 |

FOREIGN PATENT DOCUMENTS

EP    1 172 729 A2    1/2002

* cited by examiner

*Primary Examiner*—John Chavis
(74) *Attorney, Agent, or Firm*—Dickstein, Shapiro, LLP.

(57) ABSTRACT

A multithreaded processor includes a thread ID for each set of fetched bits in an instruction fetch and issue unit. The thread ID attaches to the instructions and operands of the set of fetched bits. Pipeline stages in the multithreaded processor stores the thread ID associated with each operand or instruction in the pipeline stage. The thread ID are used to maintain data coherency and to generate program traces that include thread information for the instructions executed by the multithreaded processor.

30 Claims, 4 Drawing Sheets

PROGRAM TRACING IN A MULTITHREADED PROCESSOR

FIELD OF THE INVENTION

The present invention relates to microprocessor systems, and more particularly to thread identification in a multithreaded processor.

BACKGROUND OF THE INVENTION

Modern computer systems utilize a variety of different microprocessor architectures to perform program execution. Each microprocessor architecture is configured to execute programs made up of a number of macro instructions and micro instructions. Many macro instructions are translated or decoded into a sequence of micro instructions before processing. Micro instructions are simple machine instructions that can be executed directly by a microprocessor.

To increase processing power, most microprocessors use multiple pipelines, such as an integer pipeline and a load/store pipeline to process the macro and micro instructions. Typically, each pipeline consists of multiple stages. Each stage in a pipeline operates in parallel with the other stages. However, each stage operates on a different macro or micro instruction. Pipelines are usually synchronous with respect to the system clock signal. Therefore, each pipeline stage is designed to perform its function in a single clock cycle. Thus, the instructions move through the pipeline with each active clock edge of a clock signal. Some microprocessors use asynchronous pipelines. Rather than a clock signal, handshaking signals are used between pipeline stages to indicate when the various stages are ready to accept new instructions. The present invention can be used with microprocessors using either (or both) synchronous or asynchronous pipelines.

FIG. 1 shows an instruction fetch and issue unit, having an instruction fetch stage (I stage) 105 and a pre-decode stage (PD stage) 110, coupled via an instruction buffer 115 to a typical four stage integer pipeline 120 for a microprocessor. Integer pipeline 120 comprises a decode stage (D stage) 130, an execute one stage (E1 stage) 140, an execute two stage (E2 stage) 150, and a write back stage (W stage) 160. Instruction fetch stage 105 fetches instructions to be processed. Pre-decode stage 110 predecodes instructions and stores them into the instructions buffer. It also groups instructions so that they can be issued in the next stage to one or more pipelines. Ideally, instructions are issued into integer pipeline 120 every clock cycle. Each instruction passes through the pipeline and is processed by each stage as necessary. Thus, during ideal operating conditions integer pipeline 120 is simultaneously processing 4 instructions. However, many conditions as explained below may prevent the ideal operation of integer pipeline 120.

FIG. 2 shows a typical four stage load/store pipeline 200 for a microprocessor coupled to a memory system 270, instruction fetch stage 105 and pre-decode stage 110. Load/store pipeline 200 includes a decode stage (D stage) 230, an execute one stage (E1 stage) 340, an execute two stage (E2 stage) 250, and a write back stage (W stage) 260. In one embodiment, memory system 270 includes a data cache 274 and main memory 278. Other embodiments of memory system 270 may be configured as scratch pad memory using SRAMs. Because memory systems, data caches, and scratch pad memories, are well known in the art, the function and performance of memory system 270 is not described in detail. Load/store pipeline 200 is specifically tailored to perform load and store instructions. Decode stage 230 decodes the instruction and reads the register file (not shown) for the needed information regarding the instruction. Execute one stage 240 calculates memory addresses for the load or store instructions. Because the address is calculated in execute one stage and load instructions only provide the address, execute one state 240 configures memory system 270 to provide the appropriate data at the next active clock cycle for load from memory. However, for store instructions, the data to be stored is typically not available at execute one stage 240. For load instructions, execute two stage 250 retrieves information from the appropriate location in memory system 270. For store instructions, execute two stage 250 prepares to write the data appropriate location. For example, for stores to memory, execute two stage 250 configures memory system 270 to store the data on the next active clock edge. For register load operations, write back stage 260 writes the appropriate value into a register file. By including both a load/store pipeline and an integer pipeline, overall performance of a microprocessor is enhanced because the load/store pipeline and integer pipelines can perform in parallel.

While pipelining can increase overall throughput in a processor, pipelining also introduces data dependency issues between instructions in the pipeline. For example, if instruction "LD D0, [A0]", which means to load data register D0 with the value at memory address A0, is followed by "MUL D2, D0, D1", which means to multiply the value in data register D0 with the value in data register D1 and store the result into data register d2, "MUL D2, D0, D1" can not be executed until after "LD D0, [A0]" is complete. Otherwise, "MUL D2, D0, D1" may use an outdated value in data register D0. However, stalling the pipeline to delay the execution of "MUL D2, D0, D1" would waste processor cycles. Many data dependency problems can be solved by forwarding data between pipeline stages. For example, the pipeline stage with the loaded value from [A0] targeting data register D0, could forward the value to a pipeline stage with "MUL D2, D0, D1" to solve the data dependency issue without stalling the pipeline.

Ideally, integer pipeline 120 and load/store pipeline 200 can execute instructions every clock cycle. However, many situations may occur that causes parts of integer pipeline 120 or load/store pipeline 200 to stall, which degrades the performance of the microprocessor. A common problem which causes pipeline stalls is latency in memory system 270 caused by cache misses. For example, a load instruction "LD D0, [A0]" loads data from address A0 of memory system 270 into data register D0. If the value for address A0 is in a data cache 274, the value in data register D0 can be simply replaced by the data value for address A0 in data cache 274. However, if the value for address A0 is not in data cache 274, the value needs to be obtained from the main memory. Thus, memory system 270 may cause load/store pipeline 200 to stall as the cache miss causes a refill operation. Furthermore, if the cache has no empty set and the previous cache data are dirty, the refill operation would need to be preceded by a write back operation.

Rather than stalling the pipeline and wasting processor cycles, some processors (called multithreaded processors), can switch from a current thread to a second thread that can use the processors cycles that would have been wasted in single threaded processors. Specifically, in multithreaded processors, the processor holds the state of several active threads, which can be executed independently. When one of the threads becomes blocked, for example due to a cache miss, another thread can be executed so that processor cycles are not wasted. Furthermore, thread switching may also be caused by timer interrupts and progress-monitoring software in a real-time kernel. Because the processor does not have to waste cycles waiting on a blocked thread overall performance of the processor is increased. However, different threads generally operate on different register contexts. Thus data forwarding between threads should be avoided.

Another related problem is caused by traps. Traps are generally caused by error conditions, which lead to a redirection of the program flow to execute a trap handler. The error conditions can occur in different pipeline stages and need to be prioritized in case of simultaneous occurrences. Synchronous traps need to be synchronous to the instruction flow, which means the instruction that caused the trap is directly followed by the trap handler in the program execution. Asynchronous traps usually get handled some cycles after the trap is detected. In a multithreaded processor, a trap handler needs to be able to correlate a trap to the thread, which caused the trap. Thus, most conventional processors using data forwarding or supporting synchronous traps do not allow multiple threads to coexist in the same pipeline. In these processors, processing cycles are wasted during a thread switch to allow the pipelines to empty the current thread before switching to the new thread. Other conventional processors allow multiple threads to coexist in the pipeline but do not support data forwarding and synchronous traps.

Another issue with conventional multi-threaded processors is that program tracing becomes complicated due to thread switching. Conventional embedded processors incorporate program trace output for debugging and development purposes. Generally, a program trace is a list of entries that tracks the actual instructions issued by the instruction fetch and issue unit with the program counter at the time each instruction is issued. However for multi-threaded processors, a list of program instructions without correlation to the actual threads owning the instruction would be useless for debugging.

Hence there is a need for a method or system to allow pipelines to have multiple threads without the limitations of conventional systems with regards to program tracing, data forwarding and trap handling.

SUMMARY

Accordingly, a multithreaded processor in accordance with the present invention includes a thread ID for each instruction or operand in a pipeline stage. Data forwarding is only performed between pipeline stages having the same thread ID. Furthermore, the relationship between threads and traps is easily maintained because the thread ID for each instruction that can cause the trap is available at each pipeline stage. Furthermore, the thread ID is incorporated into the program trace so that the relationship between instructions and threads can be determined.

For example in one embodiment of the present invention, a multithreaded processor includes an instruction fetch and issue unit and a pipeline. The instruction fetch and issue unit includes an instruction fetch stage configured to fetch one or more sets of fetched bits representing one or more instructions and an instruction buffer to store the sets of fetched bits. In addition the instruction buffer stores an associated thread ID for each set of fetched bits. The pipeline is coupled to the instruction fetch and issue unit and configured to receive a set of fetched bits and the associated thread ID. Each pipeline stage of the pipeline has a thread ID memory to store a thread ID associated with the instruction or operand within the pipeline stage. The multithreaded processor can also include a data forwarding unit for forwarding data between a first pipeline stage having a first thread ID and a second pipeline stage having a second thread ID. When the first thread ID is equal to the second thread ID then data forwarding is allowed. However data forwarding is prevented when the first thread ID does not match the second thread ID.

Some embodiments of the present invention also include a trap handler, which prevents trap resolution of a trap when the active thread is not the same as the thread that generated the trap. When the thread that generated the trap becomes the active thread, the trap handler resolves the trap.

Some embodiments of the present invention use thread IDs in the generation of program traces. Specifically, in one embodiment of the present invention, a trace generation unit detects issuance of instructions and generates program trace entries that include the thread IDs of the thread containing the instructions. In another embodiment of the present invention, the trace generation unit detects thread switches and generates a thread switch marker for the program trace. The thread switch marker can contain the thread ID of threads involved in the thread switch.

The present invention will be more fully understood in view of the following description and drawings.

DETAILED DESCRIPTION

As explained above, conventional multithreaded processors supporting data forwarding in pipelines, waste processing cycles to empty the current thread before loading a new thread during a thread switch, or they have a limited forwarding capability, e.g. cycle-by-cycle multithreading usually doesn't support forwarding into any pipeline stage. Processors in accordance with the present invention, attach a thread ID to instructions and operands in pipelines. The thread ID identifies the thread to which the operand or instruction belongs. Data forwarding is prevented between pipeline stages when the thread IDs of the instructions or operands in the pipeline stages do not match. The thread IDs also allows traps and to be correlated with the thread from which the trap was generated. Furthermore, the thread ID can be incorporated into a program trace to aid in debugging and development.

Figure 1:
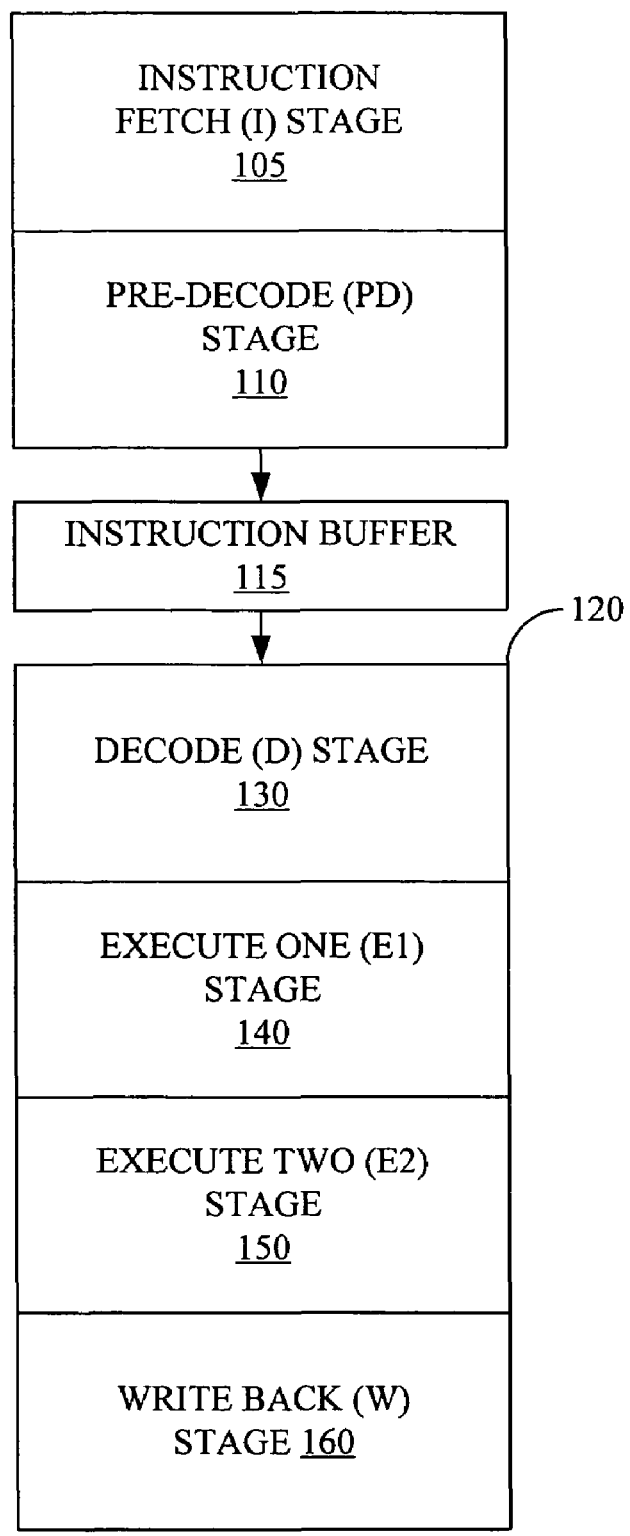
FIG. 1 is a simplified diagram of a conventional integer pipeline.
Figure 2:
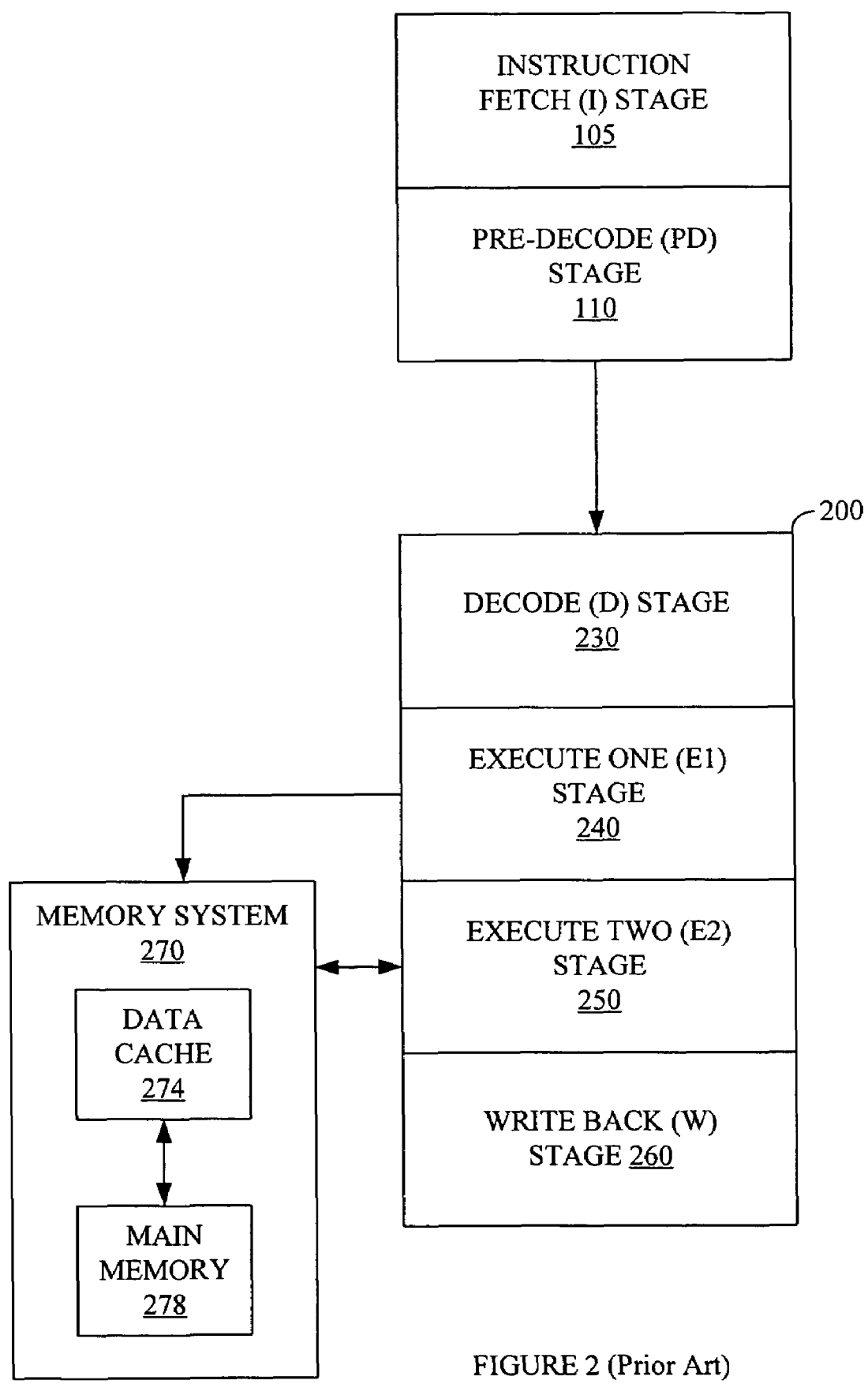
FIG. 2 is a simplified diagram of a conventional load/store pipeline.
Figure 3:
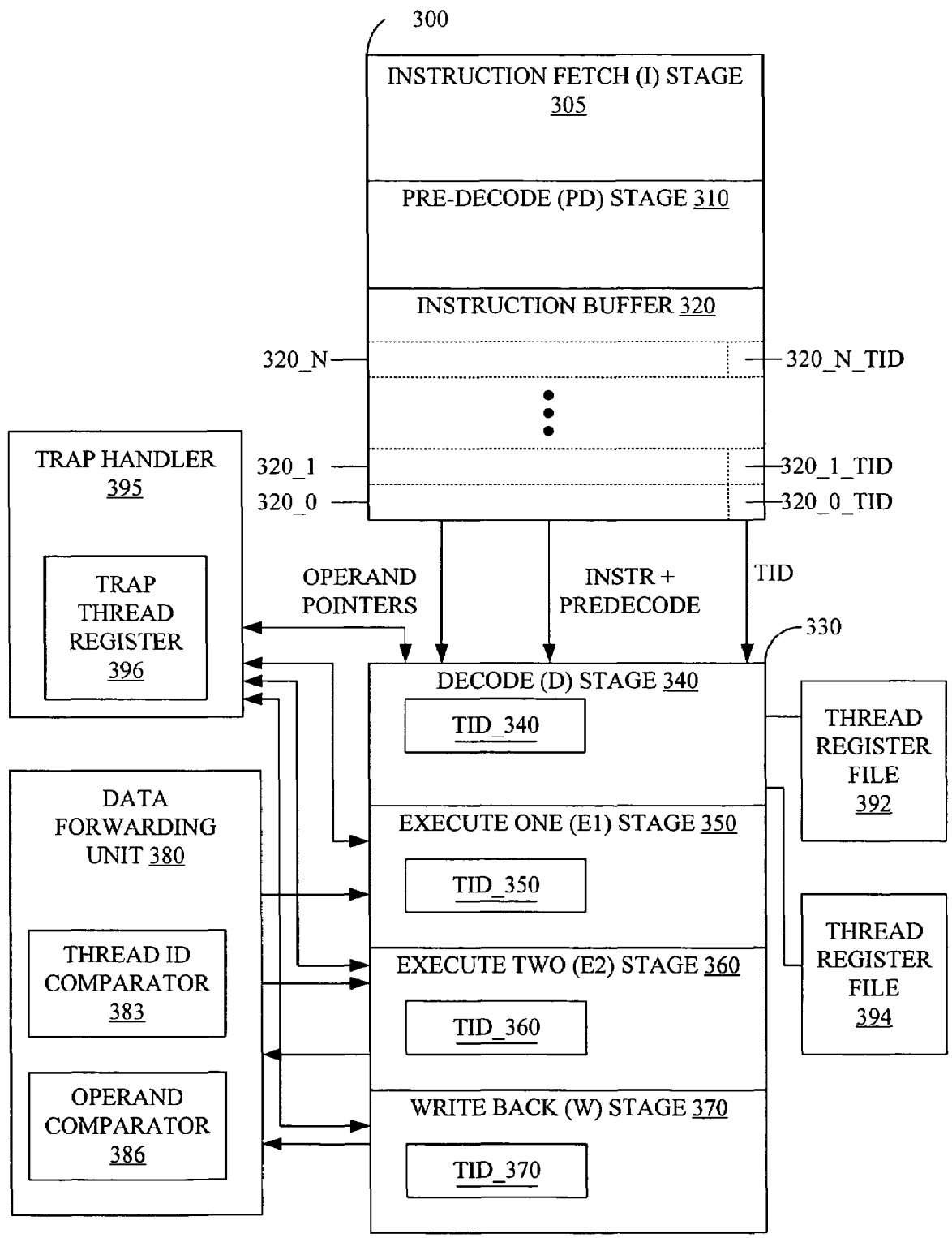
FIG. 3 is a simplified block diagram of pipeline with a data forwarding unit in accordance with one embodiment of the present invention.

FIG. 3 is a simplified block diagram of an instruction fetch and issue unit 300 with a pipeline 330. Because load store pipelines and execution pipelines behave similarly with respect to the present invention, pipeline 330 can represent both load/store pipelines and execution pipelines. Furthermore, most embodiments of the present invention would include additional pipelines coupled to instruction fetch and issue unit 300. However, for clarity and conciseness only pipeline 330 is described. Instruction fetch and issue unit 300 includes an instruction fetch stage (I stage)

305, a pre-decode stage (PD stage) 310, and an instruction buffer 320. Instruction fetch stage 305 fetches instructions to be processed. Typically, instruction fetch stage 305 fetches a set of bits having a size equal to the data width of the memory system of the processor. For example, in 64 bit systems, instruction fetch stage 305 would read a set of 64 bits. Pre-decode stage 110 performs predecoding such as generating operand pointers and grouping instructions on each set of fetched bits. The set of fetched bits are stored in a row of the instruction buffer 320. Each set of fetched bits is also given a thread ID corresponding to the thread, which owns the particular set of fetched bits. As illustrated in FIG. 3, a set of bits stored in row 320_0 has a corresponding thread ID stored with the set at thread ID memory 320_0_TID.

The set of fetched bits and the corresponding thread ID are issued to a pipeline, such as pipeline 330. Generally, the set of fetched bits have been predecoded to include operand pointers, instructions, and predecode information. Unlike conventional pipelines, the thread ID associated with the set of fetched bits attaches to the instructions and operands of the set of fetched bits. Thus, each stage of pipeline 330 includes a thread ID memory to store the thread ID associated with the operand or instruction in the pipeline stage. Thus, decode stage 340 includes a thread ID memory TID_340. Similarly, execute one stage 350, execute two stage 360, and write back stage 370, include thread ID memories TID_350, TID_360, and TID_370, respectively. Some embodiments of the present invention only supports two active threads. For these embodiments, the thread ID memories may be a single bit. For other embodiments having more active threads, the thread ID memories would be larger than a single bit.

In addition to the pipeline stages, pipeline 330 also includes a first thread register files 392 and a second thread register file 394, a data forwarding unit 380 and a thread handler 395. For clarity, only two thread register files are shown. In general, the number of thread register files is equal to the maximum number of active threads supported by the processor. Each active thread has a corresponding thread register file. The instructions and operands of a thread make use of only the corresponding thread register file.

In conventional processors supporting data forwarding, operands are forwarded when the operand being stored in a later pipeline stage is required in an earlier pipeline stage. However, in a multithreaded processor, data forwarding should only occur if the operands belong to the same thread. Thus, data forwarding unit 380 includes a thread ID comparator 383 as well as an operand comparator 386. Operand comparator 386 determines when an operand in a later stage may be needed in an earlier stage. However, the operand is forwarded only when the thread ID associated with the operand in the later stage is equal to the thread ID associated with the operand in the earlier stage.

For example, as explained above, if instruction "LD D0, [A0]", which means to load data register D0 with the value at memory address A0, is followed by "MUL D2, D0, D1", which means to multiply the value in data register D0 with the value in data register D1 and store the result into data register d2, "MUL D2, D0, D1" can not be executed until after "LD D0, [A0]" is complete. Otherwise, "MUL D2, D0, D1" may use an outdated value in data register D0. A pipeline stall is avoided by forwarding the value from memory address A0 obtained in execute two stage 360 to execute one stage 350, which needs the data from data register D0 to process "MUL D2, D0, D1". However, if instruction "LD D0, [A0]" is associated with a different thread than instruction "MUL D2, D0, D1", then data forwarding should not occur. Thus, in accordance with the present invention, data forwarding unit 380 uses thread ID comparator 383 to compare thread ID TID_360 with thread ID TID_350. If thread ID TID_350 matches thread ID TID_360 then data forwarding is allowed. Otherwise, data forwarding is prevented.

Thus, processors in accordance with the present invention can support multiple threads in a single pipeline with data forwarding when appropriate. Therefore, processors in accordance with the present invention achieve higher performance than conventional processors.

As described above, another common problem in conventional multi-threaded processors is trap handling. If a trap is detected but not resolved prior to a thread switch, errors are likely to occur as the trap is resolved. Thus as illustrated in FIG. 3, in one embodiment of the present invention, trap handler 395 includes a trap thread register 396 which stores the thread ID of the active thread when a trap is detected. Trap handler 395 resolves traps only if the thread ID of the active thread matches the thread ID of the thread that generated the trap, which stored in trap thread register 396. Thus, if a thread switch occurs after detection of a trap but before the trap can be resolved, trap handler 395 would delay handling of the trap until the thread that generated the trap is the active thread.

Another advantage of using the novel thread identification of the present invention is that program tracing can include thread information. Conventional embedded processors incorporate program trace output for debugging and development purposes. Generally, a program trace is a list of entries that tracks the actual instructions issued by the instruction fetch and issue unit with the program counter at the time each instruction is issued. Often, the program trace is compressed. One common compression technique for program traces is to tokenize the number of instructions issued, along with a notification of any program flow change i.e. branches, jumps, or calls. Periodically, (every 128 or 256 instructions, for example) a synchronization operation is performed that inserts series of token that represents the number of instructions issued since the last synchronization operation, a synchronization token, and the current program counter into the program trace. A software debugger uses the tokens of the program trace determine the behavior of the processor during program execution.

However, conventional program tracing is insufficient for multithreaded processors. Specifically, a list of issued instructions even with a program counter would not be enough to determine the behavior of the processor without information about which thread contained the instructions.

Figure 4:
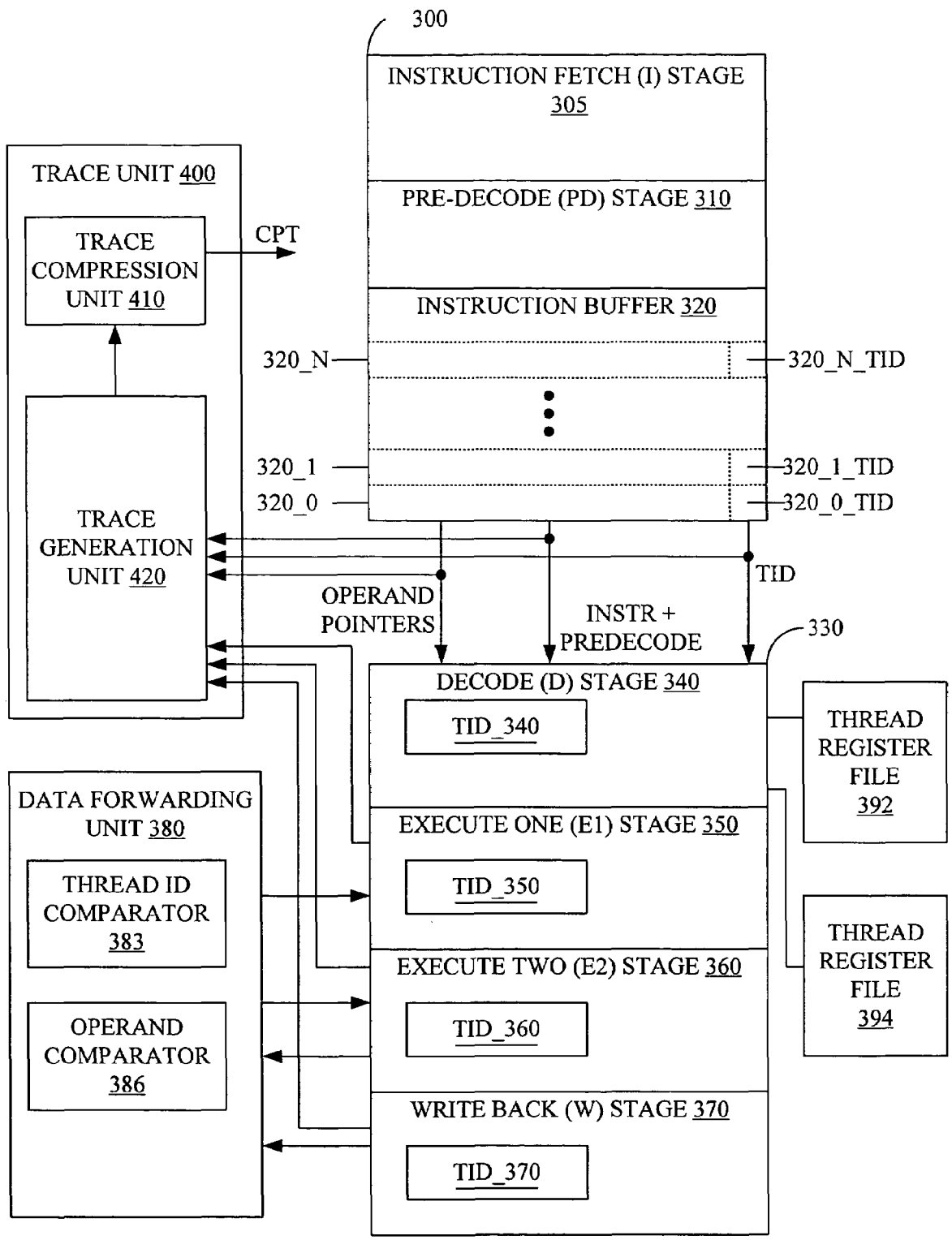
FIG. 4 is a simplified block diagram of a trace unit with a pipeline in accordance with one embodiment of the present invention.

As illustrated in FIG. 4, some embodiments of the present invention include a trace unit 400 coupled to instruction fetch and issue unit 300 and pipeline 330. Although not shown, trace unit 400 would also be coupled to the other pipelines in the processor. Trace unit 400 includes a trace generation unit 420 and a trace compression unit 410. Trace generation unit 420 receives the instruction and thread ID of each issued instruction from instruction fetch and issue unit 300. Furthermore, trace generation unit 420 monitors the pipelines to detect branches, jumps, or calls. Trace generation unit 420 generates program trace entries that together form the program trace. The program trace entries include thread identification information using the thread IDs from the pipelines and instruction fetch and issue unit 300. Trace compression unit 410 receives the program trace from trace generation unit 410 and compresses the program trace into compressed program trace 410. Any form of compression can be used in trace compression unit 410. Most embodiments of the present invention tokenize the instructions as explained above.

The present invention includes several methods of embedding thread identification in the program trace. For example, some embodiments of the present invention, adds a thread identification field for in each program trace entry. The thread identification field includes the thread ID of the instruction from instruction fetch and issue unit 300. In other embodiments of the present invention, a thread switch marker is inserted into the program trace whenever a thread switch occurs. For embodiments of trace compression unit 410 that tokenize the program trace, the thread switch marker is tokenized into a thread switch token.

In a specific embodiment of the present invention, each program trace entry includes a thread identification field. Trace compression unit 410 tokenizes the program trace into tokens that include a thread identification field. Furthermore, a synchronization operation is performed whenever a thread switch occurs. As explained above a synchronization operation inserts series of token that represents the number of instructions issued since the last synchronization operation, a synchronization token, and the current program counter into the program trace.

In the various embodiments of this invention, novel structures and methods have been described to use thread IDs to maintain data coherency and to generate meaningful program traces in multithreaded processors. The various embodiments of the structures and methods of this invention that are described above are illustrative only of the principles of this invention and are not intended to limit the scope of the invention to the particular embodiments described. For example, in view of this disclosure, those skilled in the art can define other instruction fetch and issue units, piplines, pipeline stages, instruction buffers, data forwarding units, thread ID comparators, operand comparators, Trace Units, Trace generation units, trace compression units, and so forth, and use these alternative features to create a method or system according to the principles of this invention. Thus, the invention is limited only by the following claims.

What is claimed is:

1. A method of generating a program trace on a multi-threaded processor, the method comprising:
   detecting issuance of a first instruction;
   generating a first program trace entry for the first instruction, wherein the first program trace entry includes a first thread ID for the first instruction;
   detecting issuance of a second instruction;
   generating a second program trace entry for the second instruction, wherein the second program trace entry includes a second thread ID for the second instruction, wherein the first thread ID is different than the second thread ID;
   detecting the occurrence of a thread switch; and
   performing a synchronization operation in response to the thread switch, wherein the synchronization operation comprises inserting a number equal to the number of instructions issued since a previous synchronization operation into the program trace.

2. The method of claim 1, wherein the synchronization operation further comprises inserting a program counter into the program trace.

3. The method of claim 1, further comprising compressing the program trace.

4. The method of claim 3, wherein the compressing the program trace comprises tokenizing the first program trace entry and the second program trace entry.

5. The method of claim 1, further comprising periodically performing synchronization operations with the program trace.

6. A program trace generator for generating a program trace on a multithreaded processor comprising:
   means for detecting issuance of a first instruction;
   means for generating a first program trace entry for the first instruction, wherein the first program trace entry includes a first thread ID for the first instruction;
   means for detecting issuance of a second instruction;
   means for generating a second program trace entry for the second instruction, wherein the second program trace entry includes a second thread ID for the second instruction, wherein the first thread ID is different than the second thread ID;
   means for detecting the occurrence of a thread switch; and
   means for performing a synchronization operation in response to the thread switch, wherein the means for performing a synchronization operation comprises means for inserting a number equal to the number of instructions issued since a previous synchronization operation into the program trace.

7. The program trace generator of claim 6, wherein the means for performing a synchronization operation further comprises means for inserting a program counter into the program trace.

8. The program trace generator of claim 6, further comprising means for compressing the program trace.

9. The program trace generator of claim 8, wherein the means for compressing the program trace comprises means for tokenizing the first program trace entry and the second program trace entry.

10. The program trace generator of claim 6, further comprising means for periodically performing synchronization operations with the program trace.

11. A method of generating a program trace on a multithreaded processor, the method comprising:
    detecting issuance of a first instruction;
    generating a first program trace entry for the first instruction;
    detecting a thread switch; and
    inserting a thread switch marker into the program trace when a thread switch is detected.

12. The method of claim 11, further comprising:
    detecting issuance of a second instruction; and
    generating a second program trace entry for the first instruction.

13. The method of claim 12, wherein the first instruction is from first thread and the second instruction is from a second thread.

14. The method of claim 11, further comprising compressing the program trace.

15. The method of claim 14, wherein the compressing the program trace comprises:
    tokenizing the first program trace entry to form a first program trace token; and
    tokenizing the thread switch marker into a thread switch token.

16. The method of claim 11, further comprising periodically performing synchronization operations with the program trace.

17. The method of claim 16, wherein the synchronization operation further comprises inserting a program counter into the program trace.

18. The method of claim 11, wherein the thread switch marker contains a first thread ID of the active thread after the thread switch.

19. The method of claim 18, wherein the thread switch marker contains a second thread ID of the active thread before the thread switch.

20. A program trace generator for generating a program trace on a multithreaded processor, the program trace generator comprising:
- means for detecting issuance of a first instruction;
- means for generating a first program trace entry for the first instruction;
- means for detecting a thread switch; and
- means for inserting a thread switch marker into the program trace when a thread switch is detected.

21. The program trace generator of claim 20, further comprising:
- means for detecting issuance of a second instruction; and
- means for generating a second program trace entry for the first instruction.

22. The program trace generator of claim 21, wherein the first instruction is from first thread and the second instruction is from a second thread.

23. The program trace generator of claim 20, further comprising means for compressing the program trace.

24. The program trace generator of claim 23, wherein the means for compressing the program trace comprises:
- means for tokenizing the first program trace entry to form a first program trace token; and
- means for tokenizing the thread switch marker into a thread switch token.

25. The program trace generator of claim 20, further comprising means for periodically performing synchronization operations with the program trace.

26. The program trace generator of claim 25, wherein the means for performing a synchronization operation further comprises means for inserting a program counter into the program trace.

27. The program trace generator of claim 20, wherein the thread switch marker contains a first thread ID of the active thread after the thread switch.

28. The program trace generator of claim 27, wherein the thread switch marker contains a second thread ID of the active thread before the thread switch.

29. A program trace generator for generating a program trace on a multithreaded processor comprising:
- detector configured to detect issuance of a first instruction;
- generator configured to generate a first program trace entry for the first instruction, wherein the first program trace entry includes a first thread ID for the first instruction;
- detector configured to detect issuance of a second instruction;
- generator configured to generate a second program trace entry for the second instruction, wherein the second program trace entry includes a second thread ID for the second instruction, wherein the first thread ID is different than the second thread ID;
- detector configured to detect the occurrence of a thread switch; and
- performer configured to perform a synchronization operation in response to the thread switch, wherein the performer comprises inserter configured to insert a number equal to the number of instructions issued since a previous synchronization operation into the program trace.

30. A program trace generator for generating a program trace on a multithreaded processor, the program trace generator comprising:
- detector configured to detect issuance of a first instruction;
- generator configured to generate a first program trace entry for the first instruction;
- detector configured to detect a thread switch; and
- inserter configured to insert a thread switch marker into the program trace when a thread switch is detected.

* * * * *

UNITED STATES PATENT AND TRADEMARK OFFICE
CERTIFICATE OF CORRECTION

| | |
|---|---|
| PATENT NO. | : 7,360,203 B2 |
| APPLICATION NO. | : 10/774193 |
| DATED | : April 15, 2008 |
| INVENTOR(S) | : Robert Ober et al. |

It is certified that error appears in the above-identified patent and that said Letters Patent is hereby corrected as shown below:

On the Title Page

Item (75)  Under ASSIGNEE , please delete "Infineon Technologies North America Corp. CA (US)" and insert -- Infineon Technologies AG (DE) --, therefor.

Signed and Sealed this
Eighth Day of March, 2011

David J. Kappos
*Director of the United States Patent and Trademark Office*